(12) United States Patent
Coupe et al.

(10) Patent No.: US 8,322,971 B2
(45) Date of Patent: Dec. 4, 2012

(54) METHOD OF MANUFACTURING A GAS TURBINE CASING OUT OF COMPOSITE MATERIAL, AND A CASING AS OBTAINED THEREBY

(75) Inventors: Dominique Coupe, Le Haillan (FR); Bruno Jacques Gerard Dambrine, Le Chatelet en Brie (FR); Francois Marie Paul Marlin, Villiers Sous Grez (FR); Olivier Michael Molinari, Avon (FR); Antoine Phelippeau, Sceaux (FR); Philippe Verseux, Paris (FR)

(73) Assignee: SNECMA, Paris (FR)

( * ) Notice: Subject to any disclaimer, the term of this patent is extended or adjusted under 35 U.S.C. 154(b) by 1325 days.

(21) Appl. No.: 12/033,624

(22) Filed: Feb. 19, 2008

(65) Prior Publication Data
US 2008/0206048 A1 Aug. 28, 2008

(30) Foreign Application Priority Data

Feb. 23, 2007 (FR) ...................................... 07 53449

(51) Int. Cl.
*F01D 21/00* (2006.01)

(52) U.S. Cl. ........................................ 415/9; 139/384 R

(58) Field of Classification Search ..................... 139/22, 139/383 R, 384 R, 387 R, 388, 408; 156/60, 156/285, 286; 415/9, 173.1, 173.4
See application file for complete search history.

(56) References Cited

U.S. PATENT DOCUMENTS

| | | | |
|---|---|---|---|
| 4,063,847 A * | 12/1977 | Simmons ...................... | 415/200 |
| 4,417,848 A | 11/1983 | Dembeck | |
| 4,699,567 A | 10/1987 | Stewart | |
| 4,902,201 A | 2/1990 | Neubert | |
| 5,263,516 A * | 11/1993 | van Schuylenburch ...... | 139/411 |
| 5,394,906 A * | 3/1995 | Farley ............................ | 139/192 |
| 5,437,538 A | 8/1995 | Mitchell | |
| 6,000,442 A * | 12/1999 | Busgen ........................ | 139/389 |
| 6,280,550 B1 * | 8/2001 | Steibel et al. ................. | 156/182 |
| 6,290,455 B1 | 9/2001 | Hemmelgarn et al. | |
| 7,101,154 B2 * | 9/2006 | Dambrine et al. ............ | 416/230 |
| 2005/0084377 A1 | 4/2005 | Dambrine et al. | |
| 2006/0093847 A1 | 5/2006 | Hornick et al. | |
| 2006/0201135 A1 | 9/2006 | Xie et al. | |
| 2006/0257260 A1 | 11/2006 | Dambrine et al. | |
| 2008/0145215 A1* | 6/2008 | Finn et al. ..................... | 415/200 |
| 2008/0156419 A1* | 7/2008 | Blanton et al. ................ | 156/180 |

FOREIGN PATENT DOCUMENTS

EP 1 526 285 A1 4/2005

(Continued)

OTHER PUBLICATIONS

Office Action issued Mar. 13, 2012, in Japanese Patent Application No. 2008-036946 (with English language translation).

*Primary Examiner* — Edward Look
*Assistant Examiner* — Joshua R Beebe
(74) *Attorney, Agent, or Firm* — Oblon, Spivak, McClelland, Maier & Neustadt, L.L.P.

(57) ABSTRACT

A composite material casing of varying thickness, in particular for a gas turbine fan, is made by forming fiber reinforcement and densifying the reinforcement with a matrix. The fiber reinforcement is made by winding superposed layers of a fiber texture onto a mandrel, the texture being made by three-dimensional weaving with varying thickness.

12 Claims, 4 Drawing Sheets

FOREIGN PATENT DOCUMENTS

| | | |
|---|---|---|
| EP | 1 674 244 A1 | 6/2006 |
| EP | 1 674 671 A2 | 6/2006 |
| JP | 58-138210 | 8/1983 |
| JP | 63-317336 | 12/1988 |
| JP | 1-99839 | 4/1989 |
| JP | 2001-200798 | 7/2001 |
| JP | 2005-133717 | 5/2005 |
| JP | 2006-177364 | 7/2006 |

* cited by examiner

METHOD OF MANUFACTURING A GAS TURBINE CASING OUT OF COMPOSITE MATERIAL, AND A CASING AS OBTAINED THEREBY

A method of manufacturing a gas turbine casing out of composite material, and a casing as obtained thereby

BACKGROUND OF THE INVENTION

The invention relates to gas turbine casings, and more particularly to fan retention casings for gas turbine aeroengines.

In a gas turbine aeroengine, the fan casing performs several functions. It defines an air inlet flow section for the engine, it supports an abradable material facing the tips of the fan blades, it optionally supports a structure for absorbing sound waves to perform acoustic treatment at the inlet to the engine, and it incorporates or supports a retention shield. The retention shield constitutes a trap for debris that retains any debris such as ingested foreign bodies or fragments of damaged blades projected by centrifuging, so as to prevent them from passing through the casing and reaching other portions of the aircraft.

It is common practice for a fan retention casing to be constituted by a relatively thin metal wall defining the inlet flow section and supporting the abradable material and the acoustic treatment, if any, together with a shield structure that is fastened onto the outside of said wall, in register with the fan. Such a shield structure can be formed by layers of fiber texture. By way of example, reference can be made to the following documents: U.S. Pat. Nos. 4,699,567; 4,902,201; and 5,437,538.

Proposals are made in document EP 1 674 244 to make a fan retention casing of constant thickness out of fiber/resin type composite material by making a fiber preform, impregnating it with a resin, and molding the resin-impregnated preform so as to obtain a desired shape directly. The preform is made by a kind of three-axis weaving.

Document US 2006/0093847 also relates to making a fan retention casing, but by forming extra thicknesses by means of layers of metal honeycomb cores interleaved between layers of fiber/resin composite material assembled thereto by adhesive, for example.

Document EP 1 674 671 also proposes making a fan retention casing out of a composite material of varying thickness, with its thickness being greater in register with the fan. Core fiber layers are superposed that are made of circumferentially-aligned braids. Other fiber layers are added that are made of spiral-wound braided fibers. The fiber layers are connected together by a thermosetting resin. In the event of an impact, kinetic energy is dissipated by delamination, i.e. by the fiber layers separating, by the resin cracking, and ultimately by the fibers breaking.

Documents US 2005/084377 and US 2006/257260 disclose a method enabling a fiber preform to be made for a composite material fan blade, the fiber preform being obtained directly as a single part by three-dimensional weaving with thickness, width, and weave varying during the weaving.

OBJECT AND SUMMARY OF THE INVENTION

An object of the invention is to provide a method of manufacturing a gas turbine casing out of composite material of varying thickness having properties that are improved, both from the structural point of view and from the point of view of being able to withstand an impact.

This object is achieved by a method of manufacturing a composite material casing of varying thickness for a gas turbine, the method comprising forming a fiber reinforcement by superposing layers of a fiber texture and densifying the fiber reinforcement with a matrix, in which method the fiber texture is made by three-dimensional weaving with varying thickness, which texture is wound as a plurality of superposed layers on a mandrel of profile corresponding to the profile of the casing that is to be made, so as to obtain a fiber preform of varying thickness and of shape corresponding to the shape of the casing to be made.

Winding a woven texture of varying thickness onto a mandrel makes it possible to obtain directly a tubular preform that has the desired profile with varying thickness.

Winding a woven texture also makes it possible to have yarns that are wound in the circumferential direction that contribute to the structural properties desired for the casing without it being necessary to insert longitudinal yarns into braids, as would appear to be necessary in above-mentioned document EP 1 674 671.

Furthermore, with a fan retention casing, it has been found that energy dissipation on impact takes place essentially by microcracking of the matrix, rather than by delamination, and thus without significant change to the shape of the casing.

Advantageously, the fiber texture is woven with its warp being taken up on a drum having a profile that is determined as a function of the profile of the casing to be made. Differential take-up of the warp yarns is thus performed as a function of their different circumferential paths during winding to form the preform.

A preform constituting a single part can be obtained by winding a three-dimensional fabric of varying thickness, even when the preform presents considerable local variations in thickness. Thus, when the casing to be made includes at least one flange, the preform may advantageously be made as a single part together with a preform portion that corresponds to the flange of the casing. A flange preform portion can thus be integrated directly in the casing preform, including yarns that are wound circumferentially in the flange preform that contribute to imparting the desired mechanical strength properties to the casing flange.

Also advantageously, the fiber texture is woven with thickness that increases progressively from its longitudinal ends in zones that are adjacent to the longitudinal ends.

The preform may be formed by three-dimensional weaving with an interlock weave.

The invention also provides a fan retention casing for a gas turbine, the casing being of varying thickness and being made of a composite material with fiber reinforcement densified by a matrix, in which the fiber reinforcement comprises a texture of varying thickness formed by three-dimensional weaving and wound into superposed layers.

The invention also provides a gas turbine aeroengine including such a fan retention casing.

BRIEF DESCRIPTION OF THE DRAWINGS

The invention can be better understood on reading the following description given by way of non-limiting indication with reference to the accompanying drawings, in which.

DETAILED DESCRIPTION OF EMBODIMENTS OF THE INVENTION

The invention is described below in the context of its application to manufacturing a fan casing for a gas turbine aeroengine.

Figure 1:
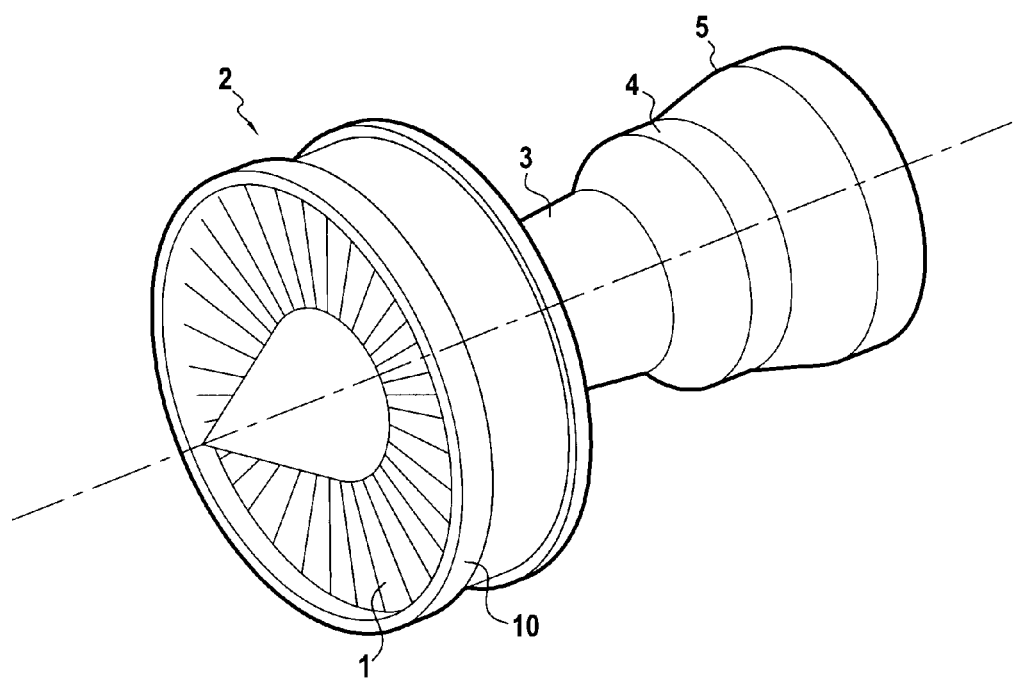
FIG. 1 is a highly diagrammatic view of a gas turbine aeroengine.

Such an engine, as shown very diagrammatically in FIG. 1, comprises going from upstream to downstream in the gas flow direction: a fan 1 disposed at the inlet to the engine; a compressor 2; a combustion chamber 3; a high pressure (HP) turbine 4; and a low pressure (LP) turbine 5. The HP and LP turbines are coupled respectively to the compressor and to the fan by respective shafts that are coaxial.

The engine is housed inside a casing comprising a plurality of portions corresponding to different elements of the engine. Thus, the fan 1 is surrounded by a fan casing 10.

Figure 2:
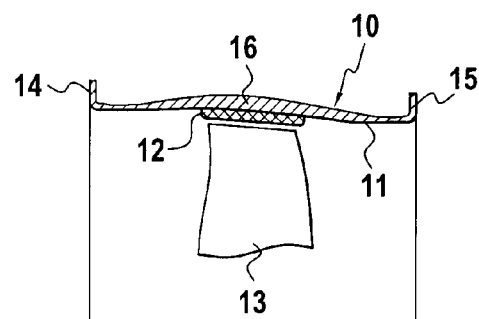
FIG. 2 is a half-view in axial section showing a retention casing profile for a gas turbine fan of the kind shown in FIG. 1.

FIG. 2 shows a profile for a fan casing 10 made of composite material as can be obtained by a method of the invention. The inside surface 11 of the casing defines the air inlet flow section. It may be provided with a layer of abradable coating 12 in register with the path followed by the tips of the fan blades, a blade 13 being shown in part and highly diagrammatically. The abradable coating is thus placed on a portion only of the length (in the axial direction) of the casing. An acoustic treatment coating (not shown) may also be placed on the inside surface 11, in particular upstream from the abradable coating 12.

The casing 10 may be provided with outwardly-directed flanges 14, 15 at its upstream and downstream ends in order to enable it to be assembled and connected with other elements. Between its upstream and downstream ends, the casing 10 presents varying thickness, with a substantially central portion 16 of the casing being thicker than its end portions and joining them progressively.

The portion 16 extends on either side of the location of the fan, both upstream and downstream, so as to form a retention casing capable of retaining debris, particles, or foreign bodies ingested on entry into the engine, causing damage to the blades of the fan, and projected radially by the rotation of the fan, in order to prevent them from passing through the casing and damaging other portions of the aircraft.

The casing 10 is made of composite material comprising fiber reinforcement densified by a matrix. The reinforcement is made of fibers, e.g. carbon, glass, aramid, or ceramic fibers, and the matrix is made of a polymer, e.g. an epoxide, a bismaleimide, or a polyimide.

According to a feature of the invention, the fiber reinforcement is formed by winding a fiber texture onto a mandrel, the texture being made by three-dimensional weaving with varying thickness, the mandrel having a profile corresponding to the profile of the casing that is to be made. Advantageously, the fiber reinforcement constitutes a complete tubular fiber preform for the casing 10 forming a single part including reinforcing portions corresponding to the flanges 14, 15.

Three-dimensional weaving is performed with take-up of warp yarns on a drum of profile that is selected as a function of the profile of the casing to be made. There is no need to select a drum with a profile that reproduces the profile of the inside surface of the casing that is to be made, as is necessary for the winding mandrel. For convenience, it is possible during weaving to use a take-up drum that has a mean diameter that is much smaller than that of the inside surface of the casing to be made. The profile of the take-up drum is then selected so that the resulting fabric easily takes on the desired shape when subsequently being wound on the shaping mandrel. As described below, this also makes it easy to form the edge portions of the fabric that are to constitute the portions of the preform that correspond to the flanges.

Figure 3:
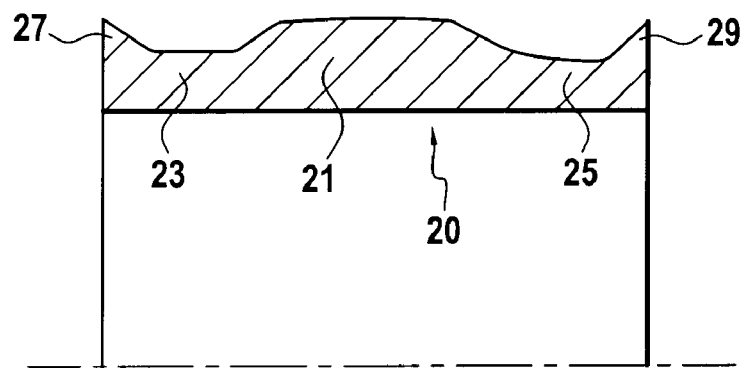
FIG. 3 is a half-view in axial section showing a take-up drum for three-dimensional weaving of a fiber textile for forming a fiber preform for a casing as shown in FIG. 2.

FIG. 3 shows an example of a take-up drum 20 for use in weaving a fiber texture suitable for obtaining a complete fiber preform for the casing 10 of FIG. 2 by being wound on a mandrel. The central portion 21 of the drum 20 runs progressively into side portions 23, 25 that are of diameter smaller than the diameter of the central portion 21, the side portions 23, 25 being connected to respective end portions 27, 29 of diameter that increases significantly going towards the axial ends of the drum 20.

The three-dimensional weaving of the fiber texture can be performed using an interlock type weave comprising a plurality of layers of warp yarns and of weft yarns. The three-dimensional fabric is given a thickness that varies or tapers, making it possible by subsequent winding to obtain a preform of varying thickness corresponding to the thickness of the casing that is to be made. The warp yarns are taken up by the drum 20, the fiber texture being wound on the drum progressively as it is woven.

Figure 4:
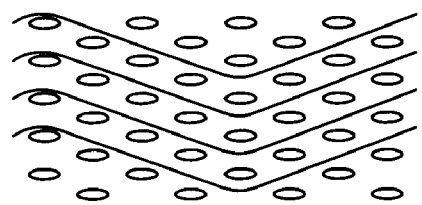
FIGS. 4 and 5 are diagrams showing interlock type three-dimensional weaves.
Figure 5:
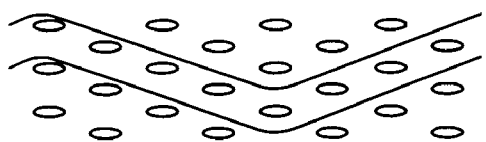

FIGS. 4 and 5 show examples of interlock weaves for two portions of the fiber texture that have different thickness, respectively a thicker central portion and thinner side portions. In FIGS. 4 and 5, the weft yarns are shown in section. Three-dimensional weaving with an interlock weave involves each warp yarn interconnecting a plurality of layers of weft yarns, the paths being followed by the warp yarns being identical. Thickness is increased/decreased progressively by adding/removing one or more layers of warp and weft yarns.

Other three-dimensional weaves can be envisaged, for example by performing multilayer weaving with multi-satin or multi-plain weaves. Such weaves are described in document WO 2006/136755.

Figure 6:
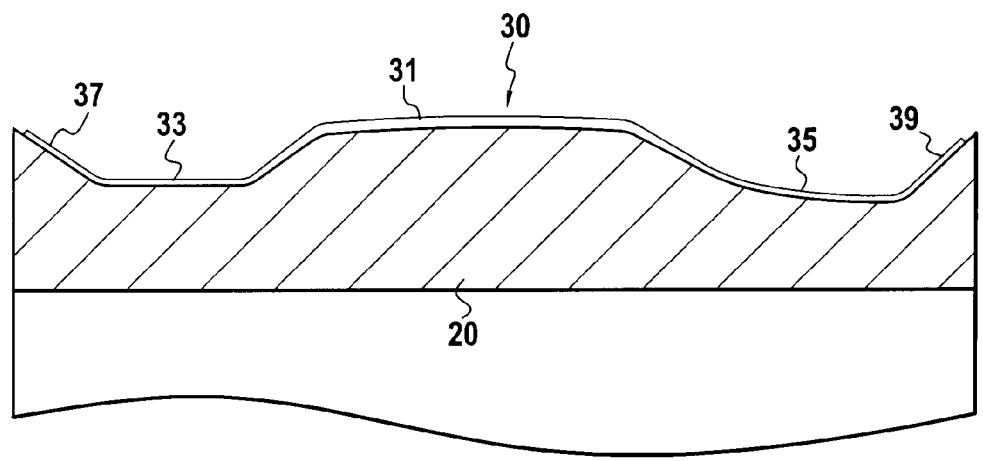
FIG. 6 is a section view of a layer of the fiber texture obtained by weaving with take-up by the FIG. 3 drum.

FIG. 6 is a diagrammatic section of a layer of the fiber texture 30 as obtained on the drum 20 by three-dimensional weaving. The texture 30 comprises a central portion 31 of thickness greater than the adjacent side portions 33, 35, which portions are terminated by end portions 37, 39 that are raised outwards.

Figure 7:
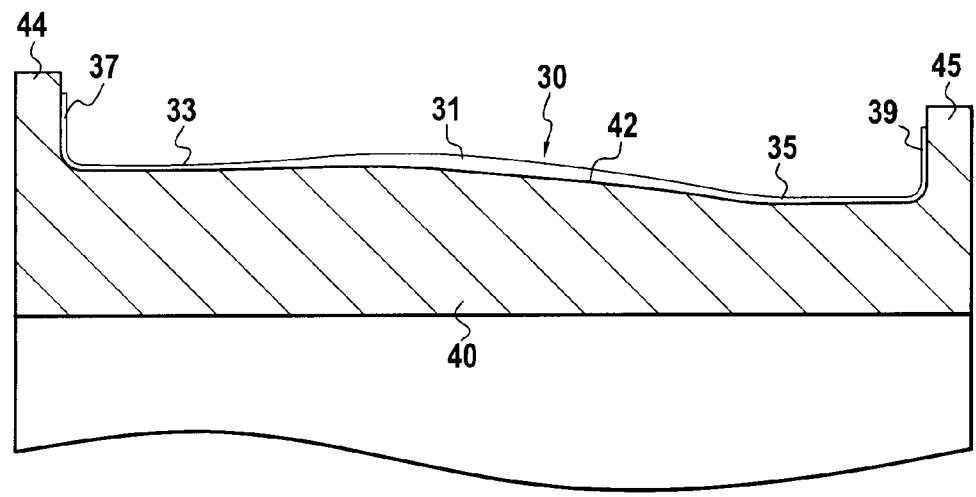
FIG. 7 is a half-view in axial section on a larger scale showing a mandrel for winding the FIG. 3 fiber texture to form the casing preform.

To obtain the fiber preform for the desired casing, the fiber texture 30 is wound in superposed layers or turns on a mandrel such as the mandrel 40 of FIG. 7.

The mandrel 40 has an outside surface 42 of profile corresponding to the profile of the inside surface of the casing that is to be made, together with two side flanges 44, 45.

By being wound on the mandrel 40, the texture 30 takes up its profile, and its end portions 37, 39 are raised, being pressed against the flanges 44, 45 so as to form preform portions that correspond to the flanges 14, 15 of the casing (FIG. 7). This produces preform portions 37, 39 that extend radially without any sudden transition at the edges of the fiber texture as woven, which would otherwise have given rise to manufacturing problems during three-dimensional weaving.

Figure 8:
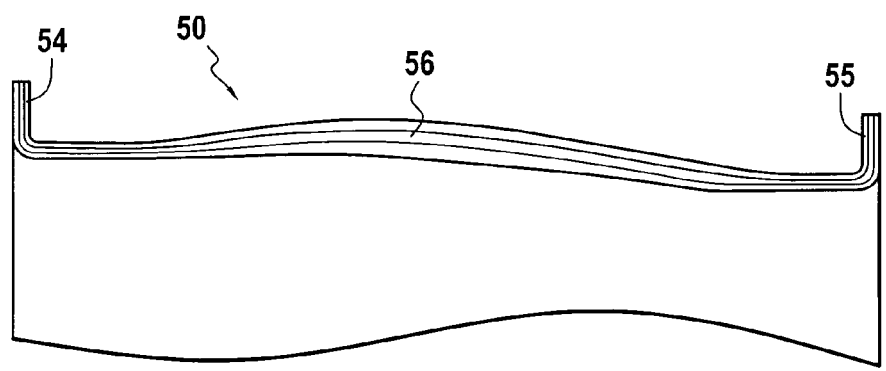
FIG. 8 is a half-view in axial section at an enlarged scale of a casing preform obtained by winding the fiber texture on the mandrel of FIG. 7.

FIG. 8 is a section view of the fiber preform 50 obtained after winding the fiber texture 30 as a plurality of layers on the mandrel 40. The number of layers or turns is a function of the desired thickness and of the thickness of the fiber texture; it is preferably not less than two. In zones adjacent to its longitudinal ends, the fiber texture can be given thickness that increases progressively from the longitudinal ends, and the length of the fiber texture can then be selected so that the terminal portions are diametrically opposite, thereby making it possible to avoid any significant extra thickness in the vicinity of the ends of the texture once wound.

A fiber preform 50 is obtained with a central portion 56 of greater thickness, corresponding to the portion 16 of the casing, and with end portions 54, 55 that correspond to the flanges 14, 15.

The preform 50 is kept on the mandrel 40 and it is impregnated with a resin. A flexible envelope or bladder is applied for this purpose onto the preform. Impregnation can be assisted by establishing a pressure difference between the outside and the volume defined by the mandrel and the bladder in which the preform is located. After impregnation, a step of polymerizing the resin is performed.

This directly produces a blank that enables the desired casing to be obtained after machining for finishing purposes.

The warp yarns of the fiber texture are wound in the circumferential direction and contribute to giving the desired mechanical strength to the casing, including in its flanges where warp yarns are present.

The circumferential continuity of the fiber texture serves to confer good impact strength leading to no or practically no delamination (i.e. separation between the superposed layers), so that damage on impact is in the form of microcracking of the matrix. The shape of the casing is thus conserved.

The impact strength of a composite material fan casing in accordance with the invention has been compared with that of a casing made of "6061" aluminum alloy as presently used for the fan casings of "CFM56-7" type engines made by the supplier CFM International. The composite material was constituted by fiber reinforcement formed by superposed layers of a three-dimensional interlock weave fabric made of carbon fibers, together with an epoxy matrix.

For equal weight per unit area, the perforation energy measured on plates of the two materials was 3000 joules (J) for the composite material, to be compared with 1500 J for the aluminum alloy.

Above, it is envisaged making the casing preform as a single part, with portions of the preform corresponding to casing flanges, if any. In a variant, the or each preform portion corresponding to a flange could be made separately, e.g. by winding a strip of fiber texture onto an end of the preform. The fiber texture strip could be made of two-dimensional or three-dimensional fabric. The connection of the wound-on fiber texture strip with the preform can be made by stitching or by implanting rigid elements, e.g. made of carbon.

Furthermore, and in known manner, the casing may be provided with stiffeners fastened on its outside surface.

The above-described method is particularly suitable for making fan casings for a gas turbine aeroengine. Nevertheless, it can also be used for other gas turbine casings or casing elements, in particular for gas turbine aeroengines, such as casings for nozzles or mixers.

What is claimed is:

1. A method of manufacturing a composite material casing of varying thickness for a gas turbine, the method comprising:
    forming a woven fiber texture of varying thickness, the woven fiber texture having a plurality of layers of warp yarns and a plurality of layers of weft yarns woven together by three-dimensional weaving,
    forming a fiber preform of varying thickness and of shape corresponding to the shape of the casing to be made by winding said woven fiber texture into a plurality of superposed turns on a mandrel having a profile corresponding to the profile of the casing to be made, and
    densifying the preform with a matrix.

2. A method according to claim 1, wherein the fiber texture is woven with its warp yarns being taken up on a drum having a profile that is determined as a function of the profile of the casing to be made, the drum being distinct from said mandrel.

3. A method according to claim 1, for manufacturing a casing having at least one fastening or connection flange, wherein the preform is made as a single part with a preform portion corresponding to the flange of the casing.

4. A method according to claim 1, wherein the fiber texture is woven with thickness that increases progressively from its longitudinal ends in zones that are adjacent to the longitudinal ends.

5. A method according to claim 1, wherein the preform is formed by three-dimensional weaving with an interlock weave.

6. A fan retention casing for a gas turbine, the casing being made of composite material with a fiber reinforcement densified by a matrix, wherein the fiber reinforcement comprises a woven fiber texture of varying thickness having a plurality of layers of warp yarns and a plurality of layers of weft yarns woven together by three-dimensional weaving, the woven fiber texture being wound into superposed layers.

7. A casing according to claim 6, including at least one flange, wherein the fiber reinforcement is made as a single part including a flange-reinforcing portion.

8. A gas turbine aeroengine including a fan retention casing according to claim 6 or claim 7.

9. A gas turbine aeroengine including a fan retention casing according to claim 7.

10. A gas turbine aeroengine including a fan retention casing manufactured by the method of claim 1.

11. A gas turbine aeroengine including a fan retention casing manufactured by the method of claim 2.

12. A gas turbine aeroengine including a fan retention casing manufactured by the method of claim 3.

* * * * *